(12) United States Patent
Barrou

(10) Patent No.: US 7,681,954 B2
(45) Date of Patent: Mar. 23, 2010

(54) SEAT WITH A PIVOTING HEADREST

(75) Inventor: Laurent Barrou, Castelnau D'Estretefonds (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 12/125,446

(22) Filed: May 22, 2008

(65) Prior Publication Data

US 2008/0290714 A1    Nov. 27, 2008

(30) Foreign Application Priority Data

May 23, 2007    (FR) .................................. 07 55221

(51) Int. Cl.
A47C 7/38        (2006.01)
(52) U.S. Cl. ...................................... 297/408
(58) Field of Classification Search ............... 297/408
See application file for complete search history.

(56) References Cited

U.S. PATENT DOCUMENTS

| | | | | |
|---|---|---|---|---|
| 2,869,622 A * | 1/1959 | Petersen et al. | ......... | 297/408 X |
| 3,888,540 A * | 6/1975 | Protze et al. | ............ | 297/408 X |
| 4,711,494 A * | 12/1987 | Duvenkamp | ............ | 297/408 X |
| 4,796,953 A * | 1/1989 | Pereira | .................. | 297/408 X |
| 5,011,226 A * | 4/1991 | Ikeda et al. | ................. | 297/408 |
| 5,145,233 A * | 9/1992 | Nagashima | ................ | 297/408 |
| 5,346,282 A * | 9/1994 | De Filippo | .............. | 297/403 X |
| 5,364,164 A | 11/1994 | Kuranami | | |
| 5,669,668 A * | 9/1997 | Leuchtmann | ................ | 297/408 |
| 5,722,732 A * | 3/1998 | Haldenwanger | ........ | 297/391 X |
| 5,738,411 A * | 4/1998 | Sutton et al. | ............. | 297/408 X |
| 5,795,023 A * | 8/1998 | Kayumi | ...................... | 297/331 |
| 5,823,619 A * | 10/1998 | Heilig et al. | ........... | 297/216.12 |
| 5,826,942 A * | 10/1998 | Sutton et al. | ............. | 297/403 X |
| 5,906,414 A * | 5/1999 | Rus | .............................. | 297/408 |
| 6,050,633 A * | 4/2000 | Droual | .................... | 297/408 X |
| 6,074,011 A * | 6/2000 | Ptak et al. | .................... | 297/408 |
| 6,129,421 A * | 10/2000 | Gilson et al. | ................. | 297/408 |
| 6,250,716 B1 * | 6/2001 | Clough | ........................ | 297/408 |
| 6,508,512 B2 * | 1/2003 | Saberan et al. | .............. | 297/408 |
| 6,511,130 B2 * | 1/2003 | Dinkel et al. | ............. | 297/408 X |
| 6,612,653 B2 * | 9/2003 | Takata | ........................ | 297/408 |
| 6,616,235 B1 * | 9/2003 | Khavari et al. | .............. | 297/408 |
| 6,666,517 B2 * | 12/2003 | Clough | .................... | 297/408 X |
| 6,702,385 B2 * | 3/2004 | Holdampf et al. | ........... | 297/408 |
| 6,860,564 B2 * | 3/2005 | Reed et al. | ................... | 297/408 |
| 6,880,890 B1 * | 4/2005 | DeBrabant | .................. | 297/408 |
| 6,899,395 B2 * | 5/2005 | Yetukuri et al. | ............. | 297/408 |
| 7,040,705 B2 * | 5/2006 | Clough | .................... | 297/408 X |

(Continued)

FOREIGN PATENT DOCUMENTS

DE        30 42 802 A1    6/1982
EP        0 101 073 A2    2/1984

*Primary Examiner*—Rodney B White
(74) *Attorney, Agent, or Firm*—Oblon, Spivak, McClelland, Maier & Neustadt, L.L.P.

(57) ABSTRACT

A seat including a sitting surface, a back, and a headrest pivoting between a vertical position in the extension of the back and an inclined position. The back includes a vertical support consisting of a plate extending at the rear of the back of the seat and above the back and a pivotably mounting component of the headrest fastened to the vertical support, the pivotably mounting component including at least one rod extending substantially perpendicular to the vertical support.

9 Claims, 5 Drawing Sheets

U.S. PATENT DOCUMENTS

| | | | |
|---|---|---|---|
| 7,044,555 B2 * | 5/2006 | Saberan | 297/408 |
| 7,055,904 B2 * | 6/2006 | Skelly et al. | 297/408 X |
| 7,080,886 B2 * | 7/2006 | Bauer | 297/408 X |
| 7,118,171 B2 * | 10/2006 | Fowler et al. | 297/61 |
| 7,131,698 B2 * | 11/2006 | Dowty et al. | 297/408 |
| 7,201,448 B2 * | 4/2007 | Williamson et al. | 297/408 X |
| 7,234,778 B1 * | 6/2007 | Toba | 297/408 X |
| 7,322,646 B2 * | 1/2008 | Jammalamadaka et al. | 297/408 X |
| 7,325,877 B2 * | 2/2008 | Brockman et al. | 297/408 |
| 7,341,312 B2 * | 3/2008 | Gauthier et al. | 297/408 |
| 7,364,239 B2 * | 4/2008 | Clough | 297/408 X |
| 7,422,280 B2 * | 9/2008 | Brockman | 297/408 X |
| 7,429,082 B2 * | 9/2008 | Kraft et al. | 297/408 |
| 7,484,808 B2 * | 2/2009 | Yetukuri et al. | 297/408 |
| 7,543,891 B2 * | 6/2009 | Chung | 297/408 |
| 7,556,306 B2 * | 7/2009 | Yetukuri et al. | 297/408 X |
| 2005/0035642 A1 * | 2/2005 | Hake et al. | 297/396 |
| 2005/0067874 A1 * | 3/2005 | Kamrath et al. | 297/408 |
| 2005/0121963 A1 * | 6/2005 | Williamson et al. | 297/408 |
| 2005/0248198 A1 * | 11/2005 | Fowler et al. | 297/378.1 |
| 2006/0220433 A1 * | 10/2006 | Yetukuri et al. | 297/408 |
| 2006/0255635 A1 | 11/2006 | Iijima et al. | |

* cited by examiner

SEAT WITH A PIVOTING HEADREST

This invention relates to a seat with a pivoting headrest.

It finds its application in particular in the field of aeronautics for fitting out seats of an aircraft.

Generally speaking, it relates to a seat comprising a sitting surface, a back and a headrest pivoting between a vertical position, in the extension of the back, and an inclined position.

A pivoting headrest thus makes it possible for the user to enjoy two positions, a vertical position in line with the back and an inclined position for resting the nape of the neck.

A pivoting headrest generally is fastened at its base onto the back of the seat.

However, in order to allow the pivoting of the headrest around the fastening means mounted on the back, it is necessary to make one or more cut-outs in the headrest in order to allow the pivoting of the headrest around the fastening points.

These cut-outs are visible and not very attractive in one or the other of the positions of the headrest on the front face of the seat.

Furthermore, the presence of these cut-outs on the front of the seat presents pinching risks for the user.

This invention has as its object to resolve the aforementioned drawbacks and to propose a seat with a pivoting headrest having a more secure pivoting assembly structure.

To this end, this invention applies to a seat comprising a sitting surface, a back and a headrest pivoting between a vertical position in the extension of the back and an inclined position.

According to the invention, the seat comprises a vertical support consisting of a plate extending at the rear of the back of the seat and extending above the back, and means for pivoting assembly of the headrest fastened to the vertical support.

In this way, the headrest is fastened onto a vertical support consisting of a plate at the rear of the back.

The fastening at the rear of the pivoting headrest makes it possible to free the front of the headrest, whatever its position may be, vertical or inclined, of the cut-outs necessary for pivoting thereof.

The means for pivoting assembly moreover are concealed at the rear of the headrest, between the headrest and the vertical support.

According to one embodiment, the means for pivoting assembly comprise at least one rod extending more or less perpendicular to the vertical support.

In practice, the rod comprises a pivot axis integral with the headrest and the headrest comprises at least one cut-out suitable for passage of the said at least one rod.

In order to allow the pivoting of the headrest, the cut-out extends over a 90° sector that makes it possible to obtain at least two distinct positions of the headrest, 90° from one another.

According to an advantageous characteristic of the invention, the headrest is adapted to pivot from the vertical position to the inclined position in a counterclockwise direction.

In this way, the cut-out for passage of the means for pivoting assembly, and in particular of the rod, is made in a rear portion of the headrest, between the axis of pivoting of the headrest and the vertical support.

The cut-out in the headrest thus is completely concealed and shielded by the headrest.

This invention also applies to an aircraft comprising one or more seats according to the invention.

Still other features and advantages of the invention will become apparent in the description below.

In the attached drawings, provided by way of non-limitative examples:

Figure 1:
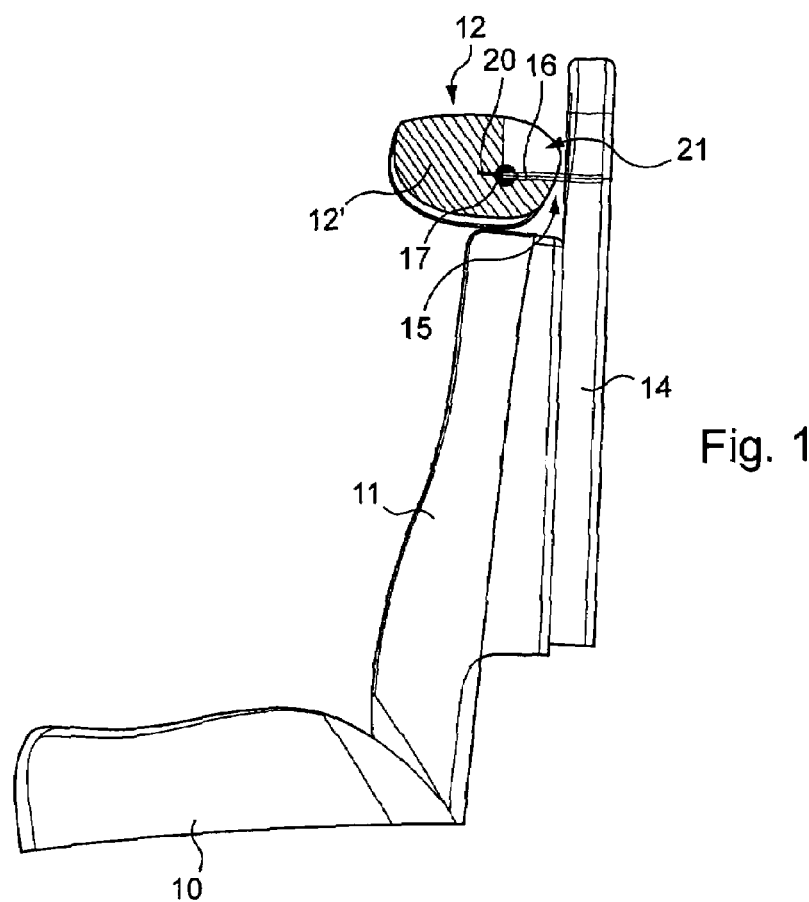
FIG. 1 is a view in cross section of a seat according to a first embodiment of the invention.
Figure 2:
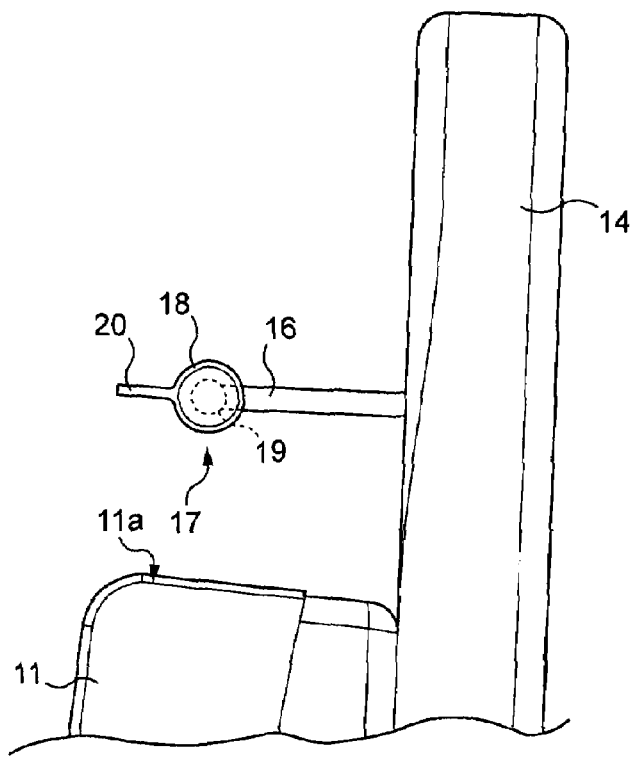
FIGS. 2 and 3 are side views illustrating the means for pivoting assembly of a headrest of a seat according to a first embodiment of the invention.
Figure 3:
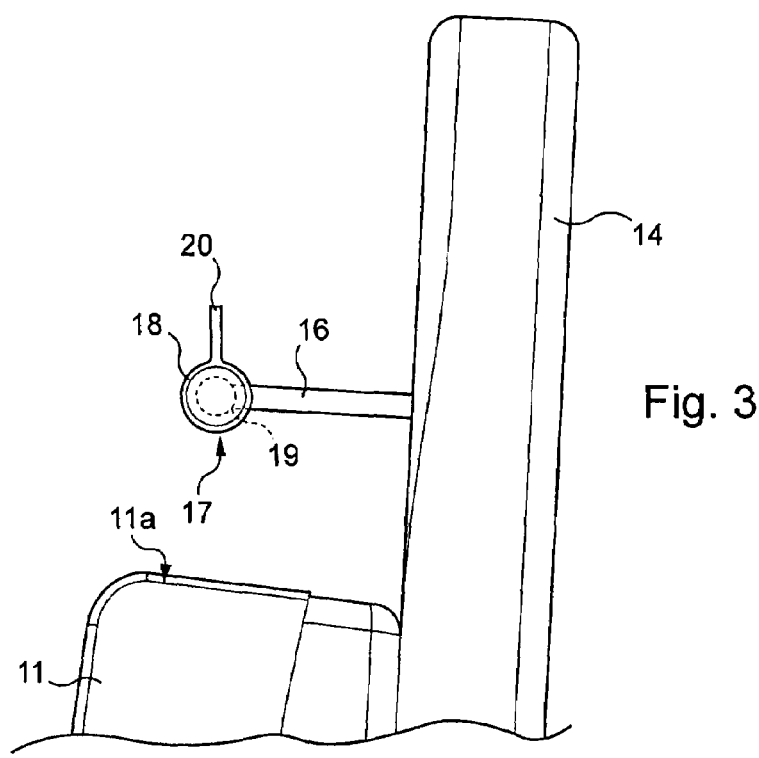

With reference to FIG. 1, a seat according to a first embodiment of the invention first will be described.

This type of seat is used in particular in aeronautics or in any other means of transportation, and in particular in situations in which the seats are lined up one behind the other.

This seat mainly comprises a sitting surface 10, a back 11 and a headrest 12.

As will be described in greater detail below, this headrest can be pivoting between an inclined position such as depicted in FIG. 1 and a vertical position in which the headrest is placed in the extension of the back 11 (see FIG. 6, for example).

The seat further comprises a vertical support 14 consisting of a component in the form of a plate. Here, this vertical support 14 consists of a plate 14 fastened to the rear of the back 11 of the seat.

Figure 8:
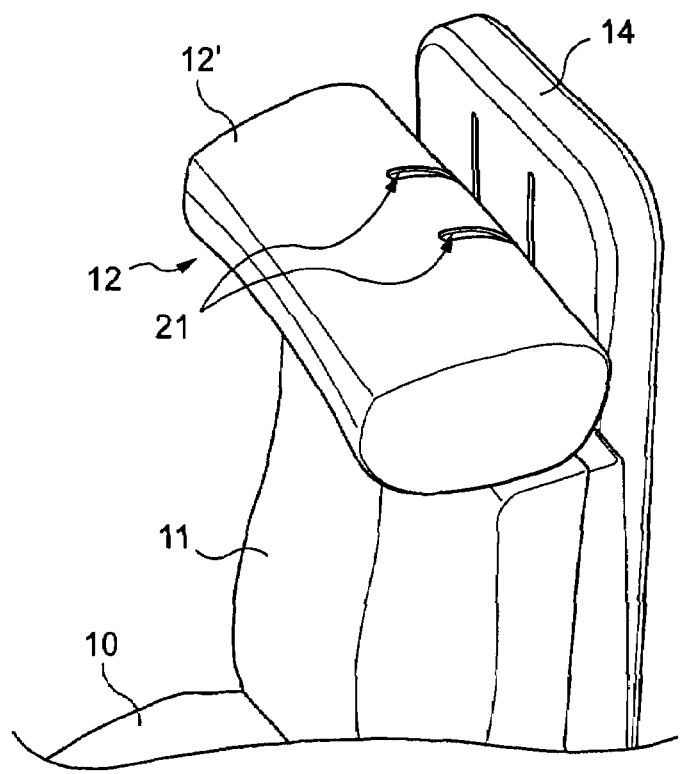
FIG. 8 is a partial perspective view of the seat in FIG. 7.

This vertical support, as clearly illustrated on FIG. 8, for example, can have a width more or less equal to the width of the back 11.

On the other hand, the height of this vertical support 14 is greater than that of the back 11 so that, as clearly illustrated in FIG. 1, the vertical support 14 extends beyond the back 11, that is, above the back.

By way of non-limitative example, this vertical support can consist of a plate made of rigid plastic or of stamped metal.

This vertical support, of course, can be an integral part of the back of the seat and thus extend above the actual portion forming a back for the user of the seat.

In addition, in a configuration in which the seats are arranged one behind the other, this support 14 can incorporate, in known manner, components intended for the passenger behind the seat under consideration, and for example a shelf, a cup holder, . . . .

As clearly illustrated in FIG. 1, means for pivoting assembly 15 of the headrest 12 are fastened to the vertical support 14.

As clearly illustrated in FIGS. 2 to 5, the means for pivoting assembly 15 comprise at least one rod 16 extending more or less perpendicular to the vertical support 14.

In this embodiment, the means for assembly comprise two rods 16 fastened to the vertical support 14.

Figure 5:
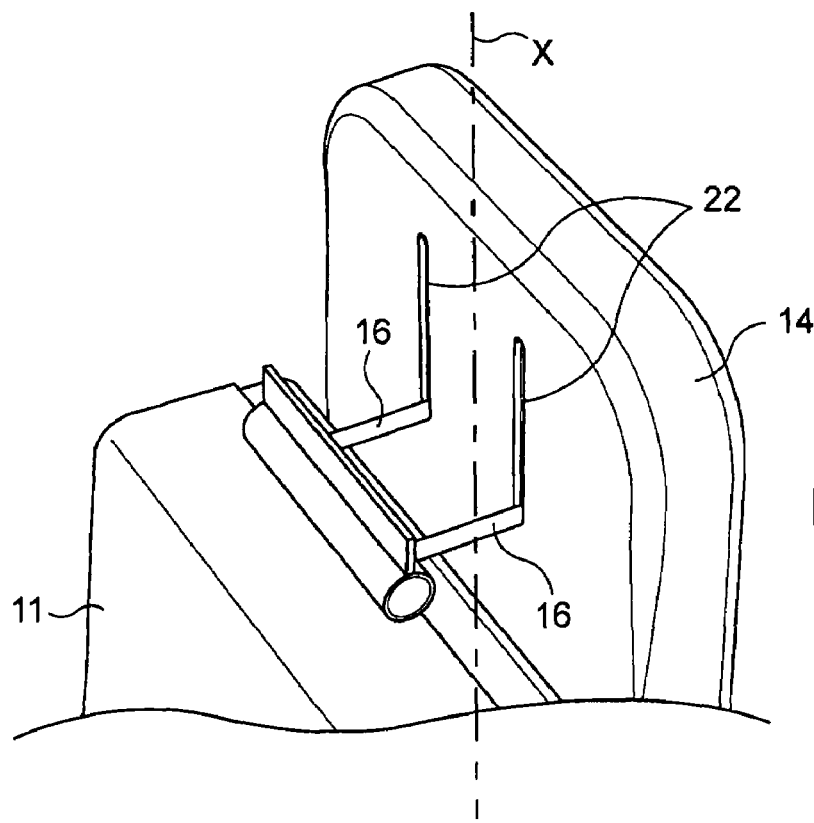

As clearly illustrated in FIG. 5, these rods are arranged more or less symmetrically in relation to a median vertical axis of the back 11 of the seat.

These fastening rods 16 thus extend in a more or less horizontal plane parallel to the upper edge 11a of the back.

Moreover, the distance separating these rods 16 from the edge 11a of the back is sufficient to allow the passage of the cushion 12' of the headrest 12 in a vertical position as well as in an inclined position, as will be described below.

In order to allow the rotating assembly of the headrest 12, the rods 16 comprise a pivot axis 17 integral with the headrest 12.

In this embodiment, this pivot axis 17 comprises a cylinder 18 mounted rotating around an axis 19 integral with one end of the rods 16.

The cylinder 18 is integral with the headrest 12, and in particular with the cushion 12' of the headrest.

To this end, the cylinder 18 comprises a fastening cramp 20 extending in the longitudinal direction of the cylinder 18 and thus forming a wing in a plane perpendicular to the cylinder 18.

The cushion 12' of the headrest 12 thus can be fastened to the cylinder 18 by shaping the cushion over around the fastening cramp 20.

Figure 4:
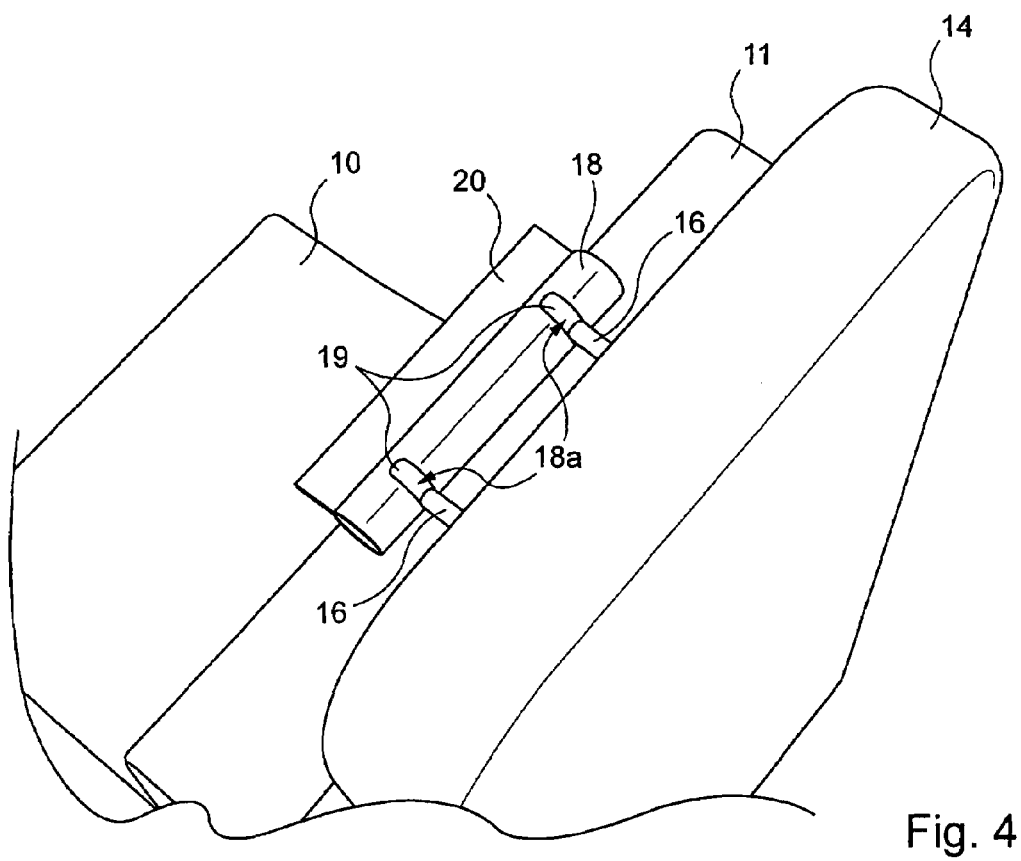
FIGS. 4 and 5 are perspective views illustrating the means for pivoting assembly in FIGS. 2 and 3.

In order to allow rotation of the cylinder 18 around the axis 19 fastened to the rods 16, the cylinder 18 comprises notches 18a such as illustrated in FIG. 4 so that the cylinder 18 can pivot around the ends of the rods 16 integral with the axis 19.

In this method of fastening with the rods 16 integral with the pivot axis 17 of the headrest, the headrest 12 comprises a cut-out 21 suitable for the passage of each rod 16.

Thus, in this embodiment, and as illustrated, for example, in FIG. 8, the headrest 12 comprises two cut-outs 21 suitable for the passage of the two rods 16, respectively, during pivoting of the headrest 12 around the pivot axis 17.

As clearly illustrated in FIG. 1, each cut-out 21 extends over a sector more or less equal to 90°, having for a center the pivot axis 17 of the headrest 12.

Of course, depending on the extreme positions desired for pivoting of the headrest, this sector can have a variable angle, for example ranging between 45° and 120°.

Figure 6:
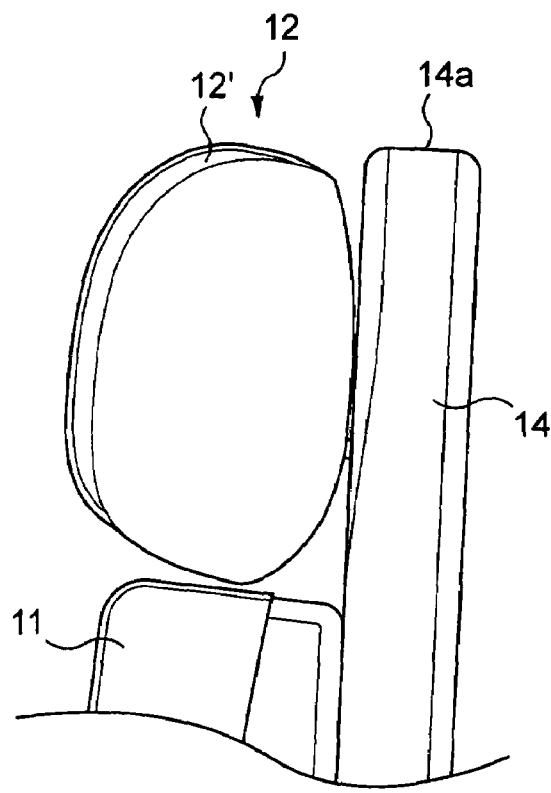
FIGS. 6 and 7 are side views illustrating a seat according to a first embodiment of the invention with the headrest in a vertical position and in an inclined position, respectively.
Figure 7:
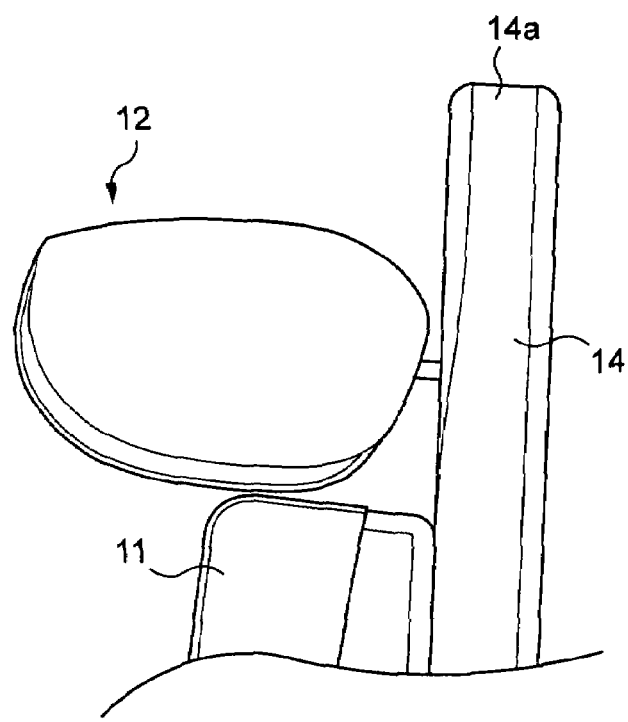

In this embodiment, as clearly illustrated in FIGS. 6 and 7, the headrest 12 is adapted to pivot from a vertical position, illustrated in FIG. 6, to an inclined position, illustrated in FIG. 7, more or less perpendicular to the vertical position.

With reference to FIG. 1, it will be noted that in this embodiment, the headrest 12 is adapted to pivot from this vertical position to the inclined position in a counterclockwise direction.

In this way, in the vertical position, the cut-outs 21 in the cushion 12' of the headrest 12 are arranged in a rear portion of the headrest, more precisely lying between the vertical support 14, the upper edge 11a of the back 11 and a vertical plane passing through the axis of pivoting 17.

During pivoting of the headrest in the inclined position, such as illustrated in FIG. 1, the cut-outs 21 then also are located in the rear portion of the headrest, between the vertical plane passing through the axis of pivoting 17 and the vertical support 14.

In this way, in one or the other of the positions, the cut-outs 21 are located at the rear of the headrest, between the latter and the vertical support 14.

Consequently, these cut-outs 21 in the headrest are concealed for the user of the seat.

This arrangement makes it possible to improve the esthetics of the seat, and in particular of the front portion of the headrest. Moreover, any risk of pinching of the user, and in particular of the hair, in these cut-outs 21 is avoided.

It also will be noted that the headrest in vertical position, such as illustrated in FIG. 6, has an edge 12b opposite the back 11 extending more or less to the height of end 14a of the plate 14 forming a vertical support extending above the back 11.

In this way, the cut-outs 21 also are concealed for a user positioned behind the seat by way of the plate 14 forming a vertical support.

Finally, in order to allow adjustment in height of this pivoting headrest 12, the means for pivoting assembly 15 are mounted sliding along a vertical direction on the vertical support 14.

As clearly illustrated in FIG. 5, the rods 16 of the means for pivoting 15 can be mounted sliding through grooves 22 extending more or less vertically in the vertical direction of the back 11 and of the plate 14.

In this way, the headrest 12 also can slide in height in a vertical direction in order to adjust the position thereof above the back 11.

In practice, sliding guidance of the rods 16 in the plate 14 can be achieved by screwing of the ends of the rods 16 into a metal plate placed at the rear of the plate 14 forming a vertical support.

Such a metal plate thus is parallel to the plate 14, preventing the rods 16 mounted sliding through the grooves 22 from being pulled out through the front.

In addition, the rods 16 are forced to retain their angle, here perpendicular, in relation to the plate 14.

In this first embodiment, the headrest can be moved from a vertical position to a horizontal position and vice versa, and thus be maintained in these extreme positions by the means for pivoting assembly coming to a stop in the cut-outs 21 of the cushion of the headrest 12.

Figure 9:
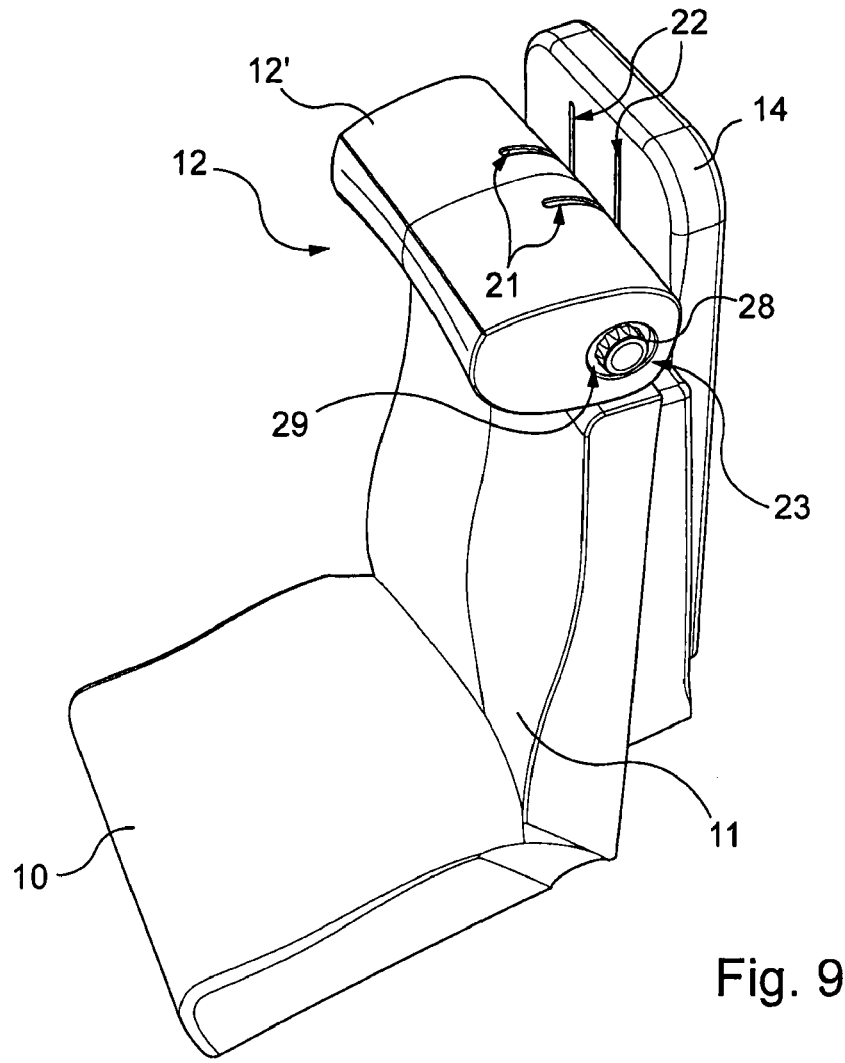
FIG. 9 is a perspective view of a seat according to a second embodiment of the invention.
Figure 10:
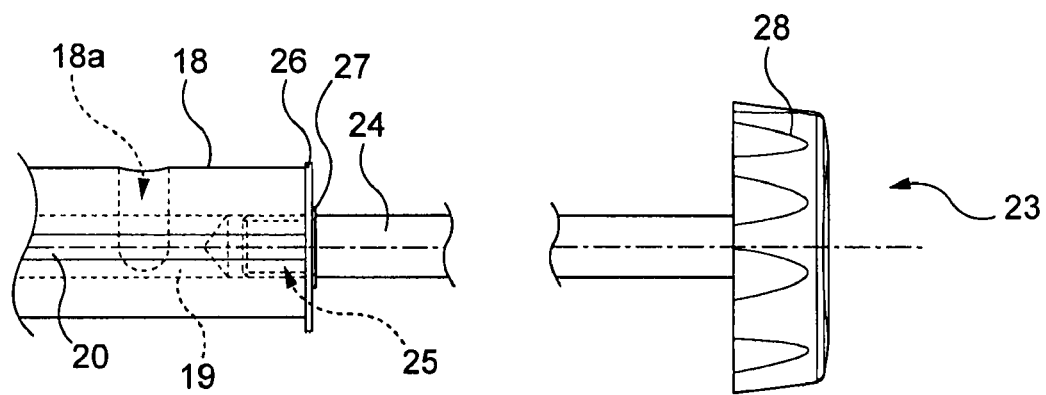
FIG. 10 illustrates, in a shortened front view, locking means for the headrest of the seat in FIG. 9.

A second embodiment of the invention, in which the seat additionally comprises means 23 for locking the headrest in position, has been illustrated on FIGS. 9 and 10.

These means 23 for locking are suitable for cooperating with the means for pivoting assembly of the headrest.

These means 23 for locking comprise a rod 24 one end 25 of which is threaded.

This end 25 is mounted by screwing into the end of the axis 19 accommodated in the cylinder 18.

In addition, a washer 26 is mounted on the rod 24, this washer coming to rest on the cylinder 18.

This washer 26 is locked on the other face by a "circlip" washer 27.

This "circlip" washer 27 can be held in position by a grooving made on the rod 24.

In addition, an operating handle is provided at the end of the rod 24 of the means 23 for locking and accessible, as clearly illustrated in FIG. 9, on one side of the headrest 12 by way of an indentation provided for this purpose.

In this way, during rotation of the handle 28, the friction of the washer 27 against the cylinder 18 is increased or decreased, through the "circlip" washer 26, until bringing about stoppage of the rotation of the headrest, that is, of the cylinder 18 around the axis 19.

In this way, it is possible by mere screwing or unscrewing of the handle 23 to ensure locking and unlocking of the headrest in a chosen position.

These means 23 for locking make it possible in particular to maintain the headrest in the vertical position or the horizontal position, but also in any other position intermediate between these two positions.

Of course, this invention is not limited to the examples of implementation described above.

The pivoting headrest in particular may not be adjustable in height.

The invention claimed is:

1. A seat comprising
a sitting surface, a back and a headrest pivoting between a
   vertical position in line with the back and an inclined position, wherein the seat comprises a vertical support consisting of a plate extending at a rear of the back of the seat and extending above the back and means for pivotably mounting of the headrest fastened to the vertical support, the pivotably mounting means including at least one rod extending substantially perpendicular to the vertical support.

2. The seat according to claim 1, wherein the rod comprises a pivot axis integral with the headrest, and the headrest comprises at least one cut-out suitable for passage of the at least one rod.

3. The seat according to claim 2, wherein the at least one cut-out extends over a 90° sector.

4. The seat according to one of claim 2 or 3, wherein the pivot axis comprises a cylinder rotatably mounted around an axis integral with one end of the at least one rod, the cylinder being integral with the headrest.

5. The seat according to claim 2, wherein the pivotably mounting means comprise at least two rods fastened to the vertical support.

6. The seat according to claim 1, wherein the headrest is adapted to pivot from the vertical position to the inclined position in a counterclockwise direction.

7. The seat according to claim 1, wherein the pivotably mounting means of the headrest are slidably mounted along a vertical direction on the vertical support.

8. The seat according to claim 1, wherein the headrest in the vertical position has an edge opposite the back extending more or less to the height of an end of the plate forming a vertical support extending above the back.

9. An aircraft wherein the aircraft comprises one or more seats according to claim 1.

* * * * *